United States Patent [19]

Manser et al.

[11] Patent Number: 5,415,884
[45] Date of Patent: May 16, 1995

[54] PROCESS AND APPARATUS FOR THE PRODUCTION OF A PRODUCT IN THE FORM OF SMALL LUMPS

[75] Inventors: Josef Manser, Uzwil; Friedrich Egger, Niederuzwil; Werner Seiler, Zueberwangen, all of Switzerland

[73] Assignee: Buehler AG, Uzwil, Switzerland

[21] Appl. No.: 958,356

[22] PCT Filed: Apr. 29, 1992

[86] PCT No.: PCT/CH92/00085

§ 371 Date: Dec. 11, 1991

§ 102(e) Date: Dec. 11, 1992

[87] PCT Pub. No.: WO92/22208

PCT Pub. Date: Dec. 23, 1992

[30] Foreign Application Priority Data

Jun. 18, 1991 [CH] Switzerland ............ 01 802/91

[51] Int. Cl.⁶ ............ A21C 1/00; A21D 8/00; A23P 1/00
[52] U.S. Cl. ............ 426/504; 366/169.1; 425/204; 425/209; 426/510
[58] Field of Search ............ 426/506, 504, 285, 453, 426/510; 366/76, 83, 96, 97, 169, 297; 425/200, 204, 205, 209

[56] References Cited

U.S. PATENT DOCUMENTS

| | | | |
|---|---|---|---|
| 3,251,695 | 3/1966 | Gidlow et al. | 426/453 |
| 3,360,865 | 1/1968 | Galle et al. | 426/453 |
| 3,574,636 | 4/1971 | Rozsa | 426/285 |
| 4,669,966 | 6/1987 | Deuren | 425/209 |

FOREIGN PATENT DOCUMENTS

| | | | |
|---|---|---|---|
| 1111650 | 2/1956 | France. | |
| 2390990 | 12/1978 | France. | |
| 2324068 | 11/1974 | Germany | 366/169 |
| 3622052 | 1/1987 | Germany | 366/76 |
| 1593027 | 7/1981 | United Kingdom. | |
| 8904610 | 1/1989 | WIPO. | |
| 9222208 | 4/1992 | WIPO. | |

*Primary Examiner*—George Yeung
*Attorney, Agent, or Firm*—McAulay Fisher Nissen Goldgerb & Kiel

[57] ABSTRACT

The novel invention proposes a novel dough kneading process and a corresponding apparatus, wherein the dough is produced in a small lump structure in a rapidly revolving centrifugal kneader. A very high percentage of granulate sizes corresponding to the size of the desired final product can be produced directly with the new process in particular for further processing of the small lumps to form couscous. The individual small lumps have a complete protein structure when leaving the whirl kneader. For large throughput capacities, the whirl kneader is constructed as a double-rotor kneader. It is important that the minimum kneading time does not fall below at least 5 to 10 seconds and it would be more advantageous not to exceed a maximum kneading time of 2 to 3 minutes.

18 Claims, 6 Drawing Sheets

PROCESS AND APPARATUS FOR THE PRODUCTION OF A PRODUCT IN THE FORM OF SMALL LUMPS

TECHNICAL FIELD

The invention is directed to a process for the production of a product in the form of small lumps from flour, middlings or semolina.

BACKGROUND ART

All industrial processing of ground cereal products with the addition of water to a product water content of more than 25% is confronted by a number of problems. The first is the question of which structure the product is to have after processing. This concerns the protein in particular. Further, a very important factor in processing is the state of the starch, whether it is to be raw or cooked or gelatinized after processing. Another question concerns the outer form of the final product. In particular, specific requirements arise from the biological and biochemical peculiarities of the ground cereal products, e.g. in relation to cleaning and maintaining the cleanliness of the plant. Hygiene is very important in this respect. All microbial spoilage must be avoided. The risk of such spoilage is high because of the high product moisture and a temperature (20°–40° C.) of the freshly moistened product which is "ideal" for the propagation of harmful microbes.

As long as the product to be ground is still in its natural state, the protein forms biochemical bonds with the added water and mechanical (kneading) action. A protein structure which gives the final product a good stability of shape, cooking stability and good texture when chewed, for instance, develops again between the flour particles which have been crushed by grinding.

The problems particular to the production of a product in the form of small lumps will now be discussed in the following with reference to the fabrication of couscous. Couscous is an industrially produced pre-cooked cereal product which, in its ready-to-eat state, is of a quality very similar to rice. In contrast to the grinding product (flour, middlings, semolina) as such, the couscous can be conserved for a long time and stored like pasta when the product moisture is less than 12%.

An industrial process for couscous production is described in the Swiss Patent CH-PS 612 835. The raw material (flour, semolina or middlings) is mixed well in exact proportions with a corresponding addition of water to a mixing trough with a slowly revolving mixer shaft for approximately 14 to 15 minutes. In so doing, lumps of approximately 10 to 40 mm in size are formed and subsequently reduced in a centrifugal beating device to a size of less than 6 mm. Endeavors were made to steam or gelatinize the individual parts in a size equal to or greater than the corresponding dimensions of the finished product particle.

The desired size of the granulate is achieved only after the drying process by reducing the agglomerate. The unwanted fine portion is fed to the raw material. In practice the best final product quality can be achieved in this way. However, returning 14 to 20% of the fine portion was found to be a substantial disadvantage, particularly since the output capacity of the entire plant is reduced by this percentage. In order to overcome this defect the product was consequently sifted while wet prior to steaming and only the fraction with an agglomerate size of 1–4 mm was steamed. All oversized agglomerates are returned to the mixing trough. In this way, also, a final product of adequate quality could be obtained and the ratio of batches for both steaming and drying could be optimized. However, two new obstacles were encountered. The quantity of oversized agglomerates which had to be returned to the mixing trough was so large that the output of the latter had to be doubled. The wet sifting caused problems in that the sieve had to be cleaned and even exchanged at frequent intervals to prevent a stopping of the sieve.

OBJECT AND SUMMARY OF THE INVENTION

The primary object of the present invention is to provide a novel process and apparatus or manufacturing plant, respectively, for overcoming the described defects, particularly so as to allow optimal overall process management, also with respect to economy of the plant, so that a final product with undiminished quality can nevertheless be achieved.

The process according to the invention is characterized in that the raw material is moistened to a water content of 25–40% in a centrifugal kneader and is shaped directly into small lumps with built-up protein structure from an agglomerated form.

As a result of the novel invention it has been recognized for the first time that the first formulations for the industrial production of a product previously fabricated by hand were in themselves correct, but that due to insufficient understanding of the laws of the processing process the simple imitation of handicraft processes did not result in an optimal industrial solution.

Investigation has shown that the individual granulates of cooked couscous are not agglomerates at all, but rather have a structure with a very well developed protein structure similar to that of pressed pasta. The protein structure also imparts the rice-like quality to the ready-to-eat couscous. The invention proposes to give the raw material a structure of small lumps rather than simply an agglomerated structure.

Agglomerate is used to designate a very hard to define, loose connection of particles which generally falls apart again into its original parts without great force. On the other hand, small lump structure designates a binding structure, predominantly via the protein structure, which can be determined microscopically.

Various attempts have been made to prepare the raw material and the water in so-called centrifugal mixers with no evidence of a genuine positive effect on the product.

It has now been recognized according to the invention that the process of forming small lumps is a gradually progressing process which was previously interrupted prematurely by the mixing and agglomerating process. However, in addition to an optimal water content, the application of genuine mechanical force is needed to build up the protein structure. For this purpose energy, "force", must be expended exactly as in dough making in the kitchen. Further, it has been recognized that the protein structure is built up very quickly under favorable marginal conditions, and not only with the classical model of dough kneading.

The novel invention allows an entire range of particularly advantageous additional constructions. For example, the centrifugal kneading is preferably effected for a period of at least 5 to 30 seconds, and this period, e.g. by means of determined inclined positions of the centrifugal members having either a more accelerating or more inhibiting action. Lengthening the time period for the formation of small lumps to more than 2 to 3 minutes has not brought about any noticeable advantages.

The temperature of the product in the centrifugal kneader should be below the 50° C. limit, particularly below 40° C.

The novel process is particularly suited to the production of couscous. In so doing, the product in the form of small lumps is preferably already shaped in the granulate size of the desired final product while in the moist state and is then steamed and dried. Lengthy series of tests have shown that a very high percentage of the small lumps discharged from the centrifugal kneader are already shaped in the correct size due to appropriate selection of the rotating speed, quantity and position of the centrifugal members as well as the exact amount of added water so that the problems of returning the unsteamed, i.e. moist, product also no longer arise.

Further, the small lumps are preferably calibrated substantially to the granulate size of the final product and the oversized lumps are reduced prior to steaming and are then steamed all together so that the problem of returning the unsteamed, overly moist agglomerates no longer even arises.

The small lumps are arranged in a continuous layer on a steaming belt and steamed in a continuous process. The cake-like fragments are chopped into small lump size again after steaming and are then dried.

It is further suggested that the dried product in the form of small lumps be sifted and the lumps which are oversized or sticking together are reduced in size by rollers. The fine portion can be returned to the centrifugal kneader.

In another particularly advantageous construction idea of the process according to the invention the raw material is moistened in a first stage, given a small lump structure, and then subjected to pressure via a pressing screw with separate drive and pressed into the desired shape of the pasta via a press mold.

The invention is further directed to an apparatus for the production of a product in the form of small lumps from flour or semolina and is characterized in that it is constructed as a tubular centrifugal kneader with a rapidly rotating rotor shaft with blades. It is proposed that the centrifugal kneader be arranged immediately subsequent to a whirl moistener which preferably has a rotor shaft with revolving water spray nozzles.

It has been shown that a process takes place in prior art, particularly immediately after the addition of water, which is difficult to control due to a number of different reactions taking place simultaneously:

the water is to be uniformly distributed;

a portion of the water binds immediately upon first contact with the raw material and agglomerates of widely disparate sizes are formed;

however, first dough particles with an incipient protein structure are formed from the start by the action of pressure and beating;

a portion of the flour and semolina particles is conveyed through the apparatus without contacting the moistening water.

A glance inside a traditional mixing trough immediately shows the simultaneous presence of all structure states with changing proportions.

In the particularly advantageous construction with the whirl moistener and centrifugal kneader a process is carried out which is not only continuous and intensive but can also be controlled at every point so that a highly uniform product in the form of small lumps is achieved at the end.

The whirl moistener and centrifugal kneader are constructed as a structural unit with a drive having a continuous rotor shaft. Proceeding from the product inlet to product discharge, it has a feed zone with feed screw, a moistening zone, and a zone in which granulates and small lumps are formed.

In another preferred construction the centrifugal kneader is constructed as a double rotor.

The rotor shaft, or rotor shafts, of the centrifugal kneader preferably has, or have, a plurality of work plates. The work plates are adjusted at an inclination in the region of the centrifugal kneader of between $-10$ and $+20$ degrees, preferably between $-4$ and $+12$ degrees, relative to the axis of the rotor shaft.

The rotor shaft performs 400 to 3000, preferably 600 to 1200, revolutions per minute.

An especially preferred advantageous use of the invention is for the production of couscous, wherein small lumps are shaped in the desired grain size of the final couscous product in the centrifugal kneader and a reducing device is provided for the oversized lumps. The outlet of the reducing device can be connected with the outlet line of the calibrating throughs in such a way that all product in the form of small lumps can be guided together via a steaming belt and then via a dryer.

In another very advantageous application the product in the form of small lumps shaped in the centrifugal kneader is transferred to a pressing screw by which pasta products are produced by pressure molding.

BRIEF DESCRIPTION OF THE DRAWINGS

The invention is described in more detail with reference to the following drawings.

DESCRIPTION OF THE PREFERRED EMBODIMENTS

Figure 1:
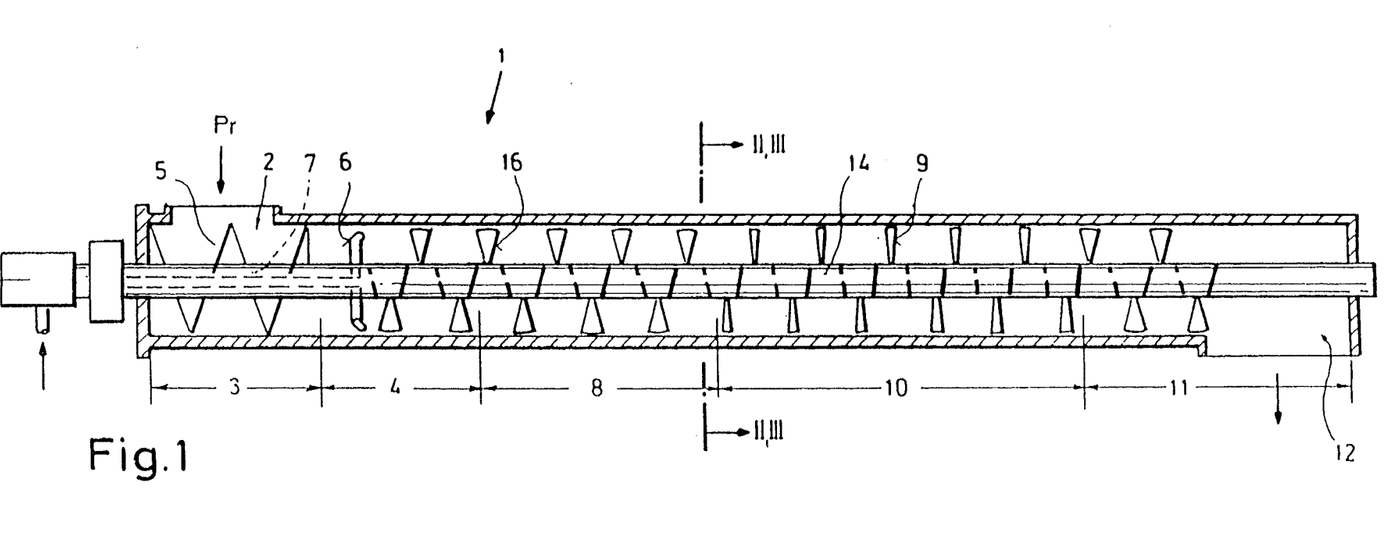
FIG. 1 shows a longitudinal section through a whirl kneader.
Figure 2A:
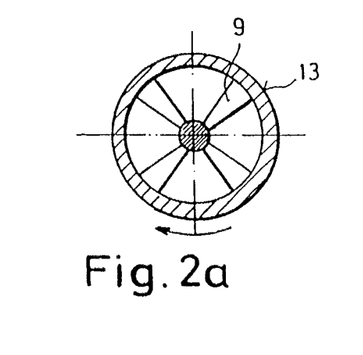
FIG. 2a shows a cross section II, II of FIG. 1 for a single-rotor kneader.
Figure 2B:
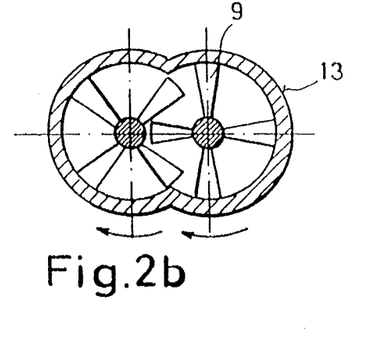
FIG. 2b shows a cross section III, III of FIG. 1 for a double-rotor kneader.

Reference is made in the following to FIGS. 1, 2a and 2b which show a whirl kneader 1. The raw material Pr is metered out in a feed zone 3 via an inlet sleeve 2. A pallet kneading shaft 14 is guided through the entire apparatus 1 and has a feed screw 5 in the feed zone 3, which feed screw 5 grasps and accelerates the product and transfers it directly to a subsequent moistening zone 4.

At the start of the moistening zone 4, two spray arms 5 which are supplied by water or steam via a bore hole 7 in the pallet kneading shaft 4 are arranged directly on the pallet kneading shaft 14 and revolve along with the latter. A plurality of whirl and mixing pallets 16 are arranged in the moistening zone 4 subsequent to the spray arms and ensure a uniform moistening of the product. A granulating zone 8 follows the moistening zone 4. A loose granulate shape is produced from an agglomeration by the intensive whirling of the product due to the high speed of e.g. 800–1200 revolutions per minute and as a result of the inherent properties of flour, for instance, with 10–30% added water. It is substantial that the agglomerate shape can be transformed directly into small lumps, which is effected in an actual kneading zone 10, by slightly inclining the kneading plates 9. By selecting the rotating speed, the added water and the angular position of the kneading plates 9, influence may be exerted on the size of the granulate, which in the case of couscous, e.g. at an average of 3–4 mm, i.e. exactly the particle size of the desired final product, can easily be achieved. Located at the end of every whirl kneader 1 is a discharge zone 11 from which the small lump having a complete protein structure is transferred for further processing via a product outlet 12.

The whirl kneader 1 can be constructed as a single-rotor kneader with a substantially cylindrical work housing 13, as can be see in FIG. 2a which shows a section II—II of FIG. 1.

To obtain products of the highest quality, and particularly with large throughput capacities, it is suggested that the whirl kneader be constructed as a double-rotor kneader, as shown in FIG. 2b, with two plate kneading shafts 14 and a corresponding double work housing 15.

A very great advantage of the two construction variants consists in that the entire work space cleans itself during operation due to the shape and fashioning of the plate kneading shaft 14.

Figure 3:
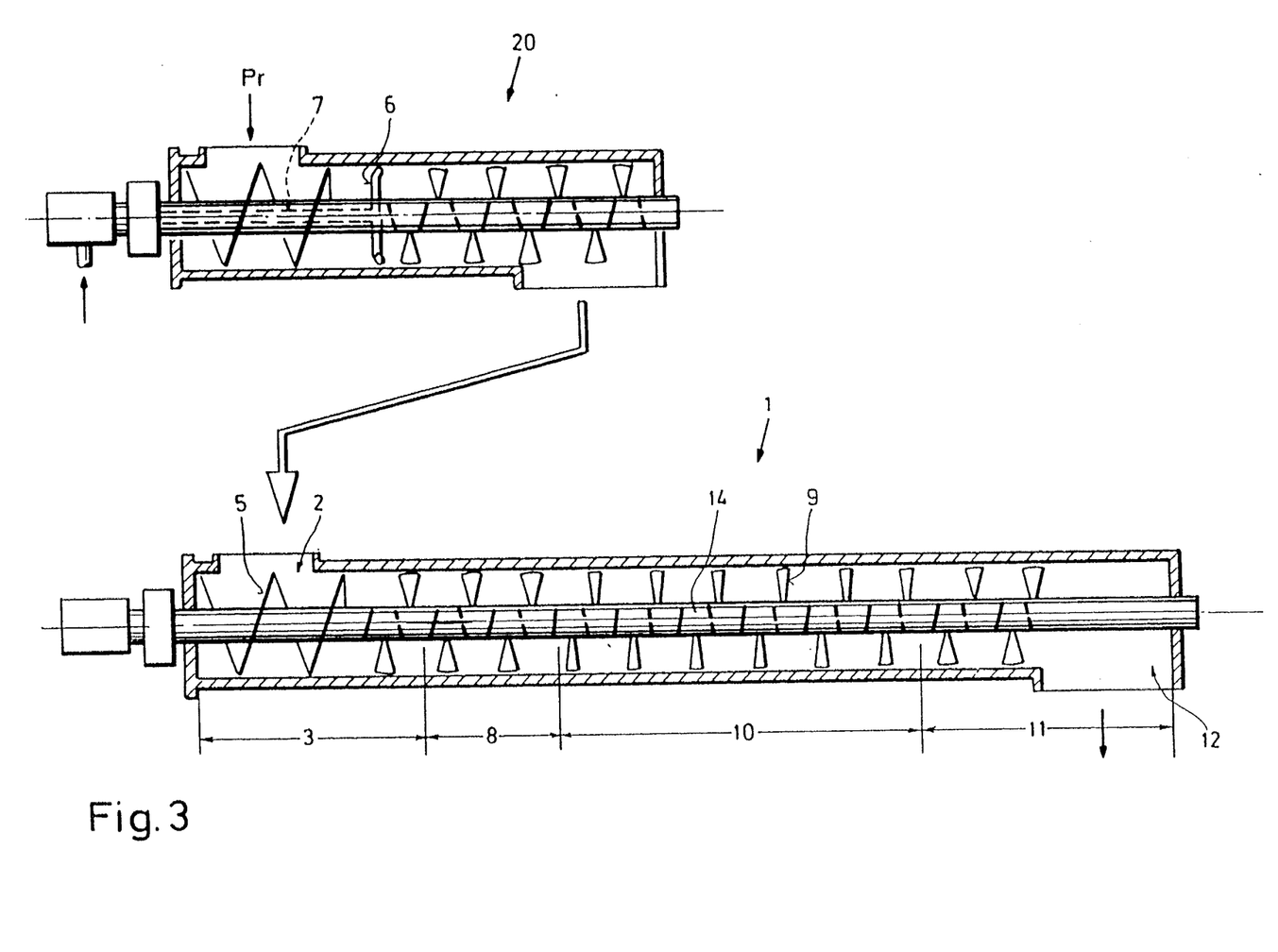
FIG. 3 shows a second construction of FIGS. 1-3.

In FIG. 3 the moistening zone occurs in a separate whirl moistener 20, no water being added in the centrifugal kneader 1.

Figure 4:
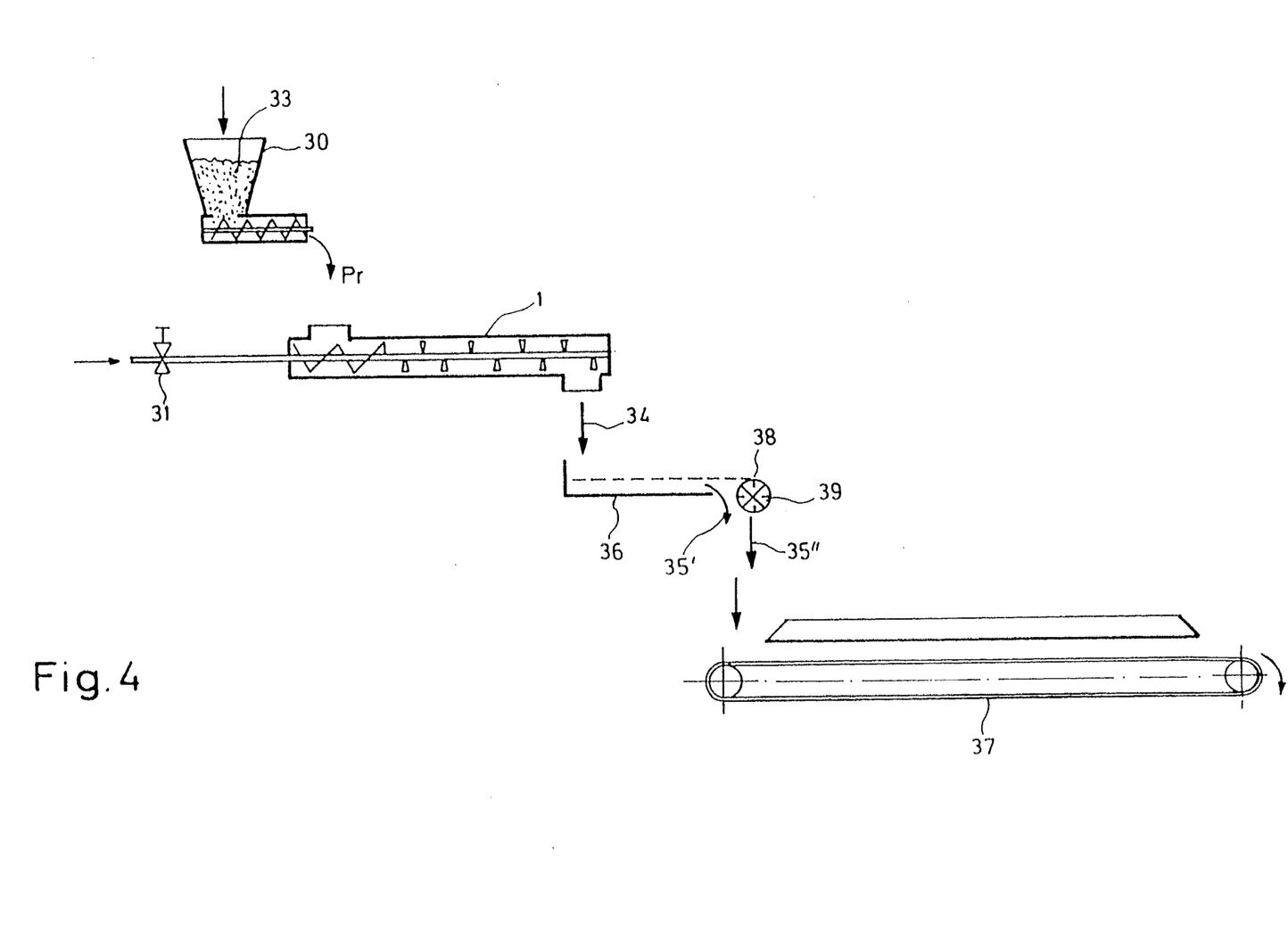
FIG. 4 is a simplified diagram of the production of couscous up to the steaming stage.

FIG. 4 is a schematic view of a plant for the production of couscous up to the steaming stage. The raw material, e.g. in the form of flour, is calculated by a proportioning apparatus 30 via a control unit 32 corresponding to a determined throughput and a desired quantity of water. The water is measured by means of a water counter 31 and mixed into the moistening zone 4 of the whirl kneader 1, the small lumps 34 being transferred to a grading sieve 36 at the end of the whirl kneader. The grain size, which is already good, is guided directly to a steaming belt 37 as sieve throughs 35, whereas oversized product 38 is reduced beforehand to the same size as the throughs 35 in a breaking and cutting device 39 and then likewise transferred to the steaming belt 37.

Figure 5:
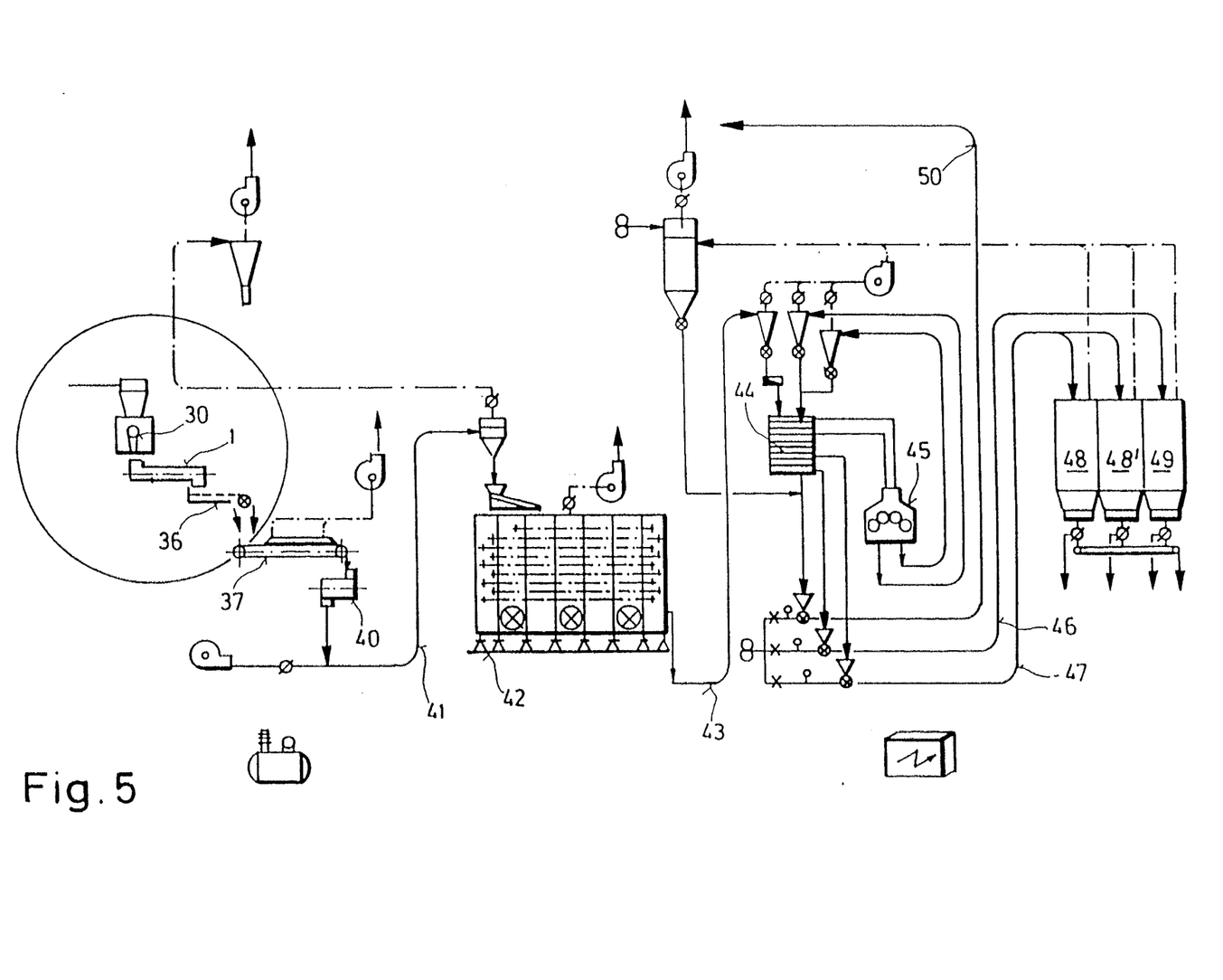
FIG. 5 is a general view of a couscous production plant.

FIG. 5 shows a complete plant for the production of couscous, only the first part of which is shown in FIG. 4 in enlarged scale. From the steaming belt 37, the substance, which appears almost like cake, is reduced again to the size of small lumps in a reducing device 40. The product is then guided into a dryer 42 via a pneumatic conveyor line 41.

The dried product reaches a sifting device 44 via another transport line 43. All oversized lumps are reduced to the desired size via a roller mill 45 and returned again to the sifting device 44. The desired fraction is transferred in two size grades to a corresponding storage cell 48, 48' and 49, respectively, via conveyors 46 and 47, respectively. The excessively fine fraction is guided back into the proportioning device 30 via conveyor 50.

Figure 6:
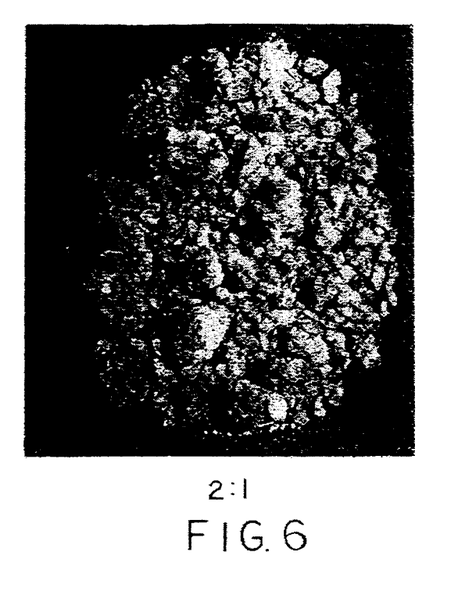
FIG. 6 shows the final product from a known mixing trough reduced in scale by a factor of two.

FIG. 6 shows the product, reduced by a scale of 2:1, as it appears when leaving the mixing trough after 14 to 15 minutes mixing time. Some agglomerates and whole lumps of dough can be discerned.

Figure 7:
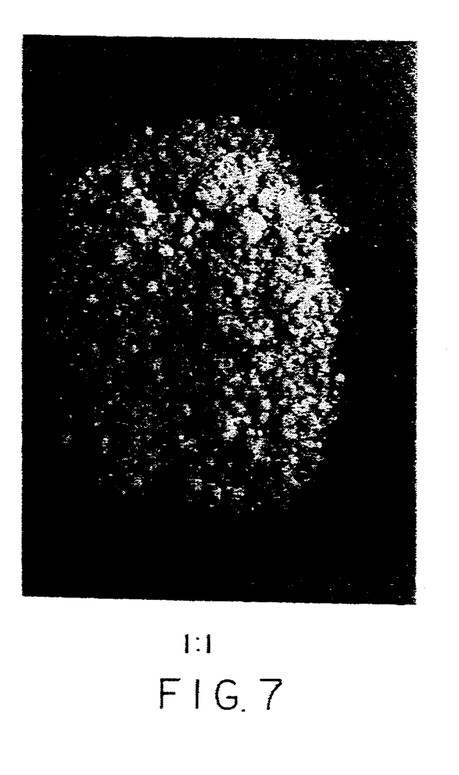
FIG. 7 is a photograph of a product in small lumps in actual size.
Figure 8:
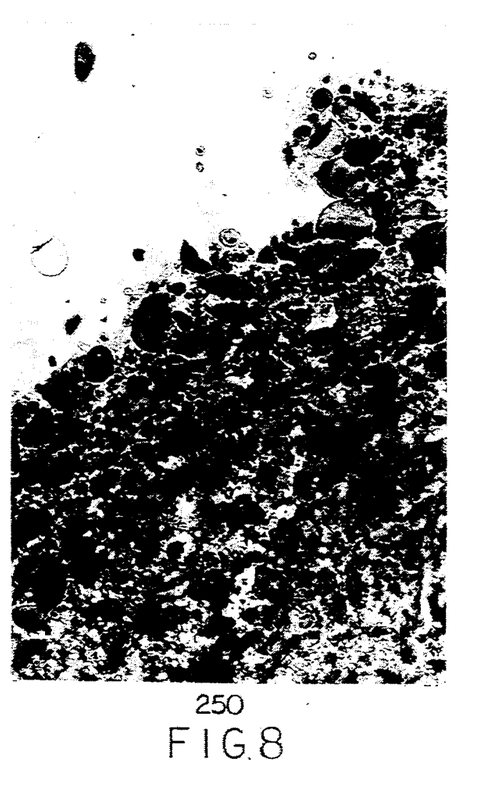
FIG. 8 shows a microscopic section through a small lump enlarged by a factor of 250, wherein the protein structure is clearly recognizable.

FIG. 7 shows the product in the form of small lumps as it appears when leaving the whirl kneader and FIG. 8 shows a microscopic section of a small lump which shows a completely produced protein structure.

Figure 9:
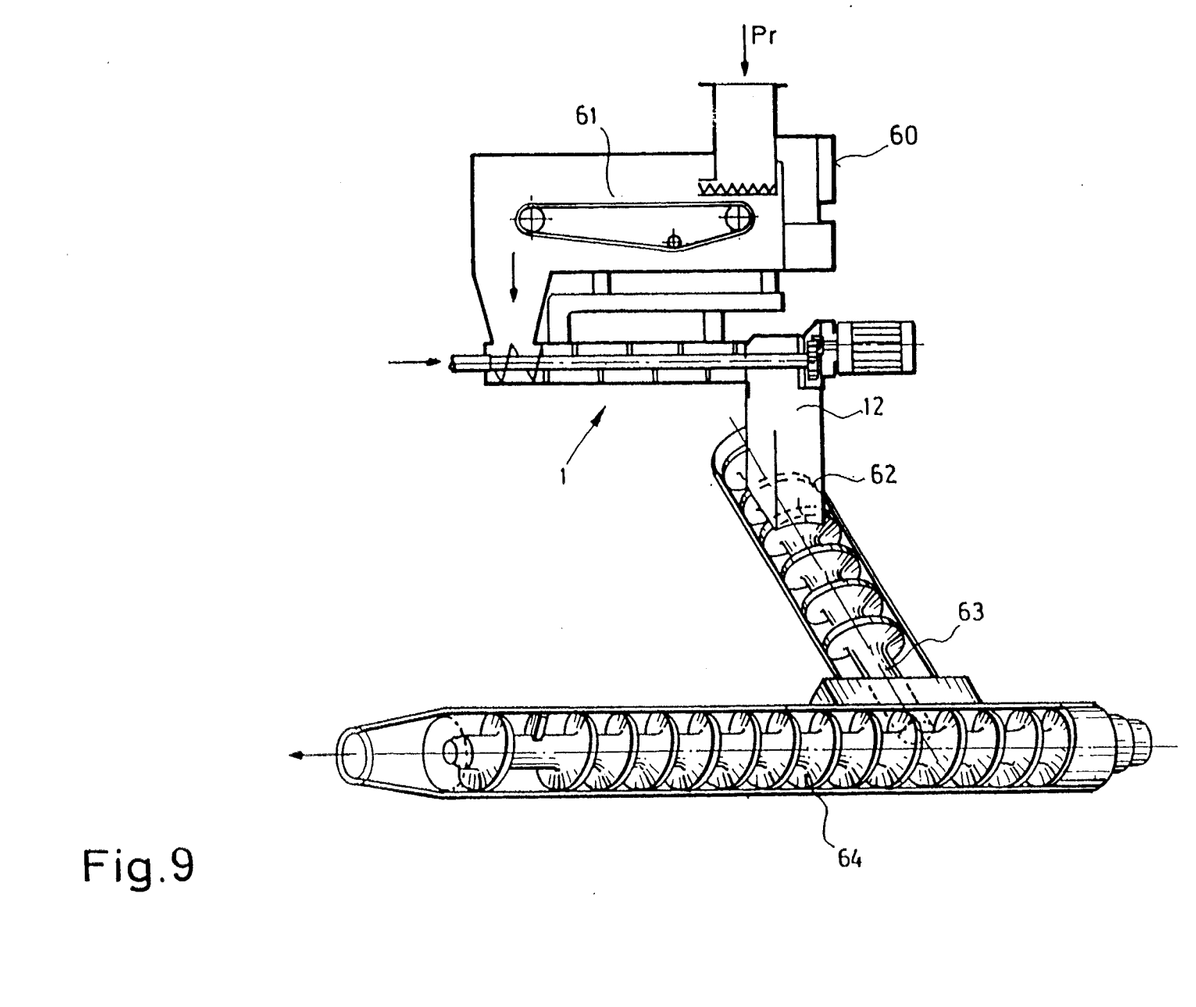
FIG. 9 shows the apparatus of the centrifugal kneader in front of a pasta press.

Reference is made in the following to FIG. 9 which shows a plant for producing pasta dough. The dried product, e.g. semolina, is metered into the feed zone of a whirl kneader 1 by means of a proportioning device 60 via a belt weigher 61. The water quantity is added directly to the moistening zone via a spray device corresponding to FIG. 1. The product in the form of small lumps leaves the whirl kneader 1 via the product outlet 12 and arrives in free fall via a shaft 62 in a transfer screw 63, from which it is transferred to the actual pressing screw for the production of a homogeneous dough which is to be pressure molded to form pasta.

What is claimed is:

1. A process for the production of a product in the form of small lumps from flour, middlings or semolina as raw material, comprising the steps of: moistening the raw material in a centrifugal kneader to a water content of 25 to 40% and transforming the moistened raw material directly from an agglomerated form to a small lump structure of the size of 3–4 mm.

2. The process according to claim 1, wherein the raw material is accelerated and whirled prior to the addition of water and the water is added by spray nozzles which participate in centrifugal movement of the raw material.

3. The process according to claim 1, wherein the moisture product is introduced into the centrifugal kneader continuously and the kneading period is 10 to 30 seconds.

4. The process according to claim 1, wherein the temperature of the product in the centrifugal kneader is less than 50° C.

5. The process according to claim 1, for the production of couscous wherein the product having the small lump structure is steamed while in the moist state.

6. The process according to claim 5, wherein the small lumps are calibrated substantially to the granulate size of the couscous product prior to steaming and oversized lumps are reduced and likewise steamed.

7. The process according to claim 5, wherein the small lumps are arranged in a layer on a steaming belt for continuous steaming to produce cake-like fragments and the cake-like fragments are reduced again to the size of small lumps by rollers after steaming.

8. The process according to claim 7, wherein the product in the form of small lumps is broken up into individual granulates and sifted after drying, and wherein oversized lumps are reduced by rollers and any is returned to the beginning of the processing process.

9. The process of claim 4 wherein the temperature of the product in the centrifugal kneader is less than 40° C.

10. Apparatus for the production of a product in the form of small lumps from flour or semolina, comprising a tubular centrifugal kneader with a rapidly rotating rotor shaft having blades, said apparatus having a product inlet and a product discharge and wherein said apparatus includes from the product inlet to the product discharge, a feed zone with feed screw, a moistening zone and a granulating and small lump forming zone.

11. The apparatus according to claim 10, further including a whirl moistener, wherein the centrifugal kneader is arranged immediately subsequent to said whirl moistener.

12. The apparatus according to claim 10, wherein the whirl moistener and centrifugal kneader are constructed as a single unit with a drive having a continuous rotor shaft.

13. The apparatus according to claim 10, wherein said rotor shaft of the centrifugal kneader has a plurality of work plates.

14. The apparatus according to claim 13, wherein said work plates of the centrifugal kneader are adjusted at an inclination of between 10 and 20 degrees relative to the axis of the rotor shaft.

15. The apparatus according to claim 13, wherein the work plates of the centrifugal kneader are adjusted to an inclination of between 4 to 12 degrees relative to the axis of the rotor shaft.

16. The apparatus of claim 11 wherein said kneader includes a plurality of rotor shafts, each having a plurality of work plates.

17. The apparatus according to claim 10, for the production of couscous wherein a reducing device having an output is provided at the product discharge for the oversized small lumps, the output of the reducing device being connected with an outlet line of calibrating troughs and the output and outlet line being guided together over a steaming belt and subsequently via a dryer.

18. Apparatus for the production of pasta, comprising a tubular centrifugal kneader having blades, said apparatus having a product inlet and a product discharge and wherein said apparatus includes from the product inlet to the product discharge, a feed zone with feed screw, a moistening zone and a granulating and small lump forming zone wherein the centrifugal kneader is constructed as a whirl kneader and is arranged upstream of a pasta pressing screw.

* * * * *